Patented May 9, 1950

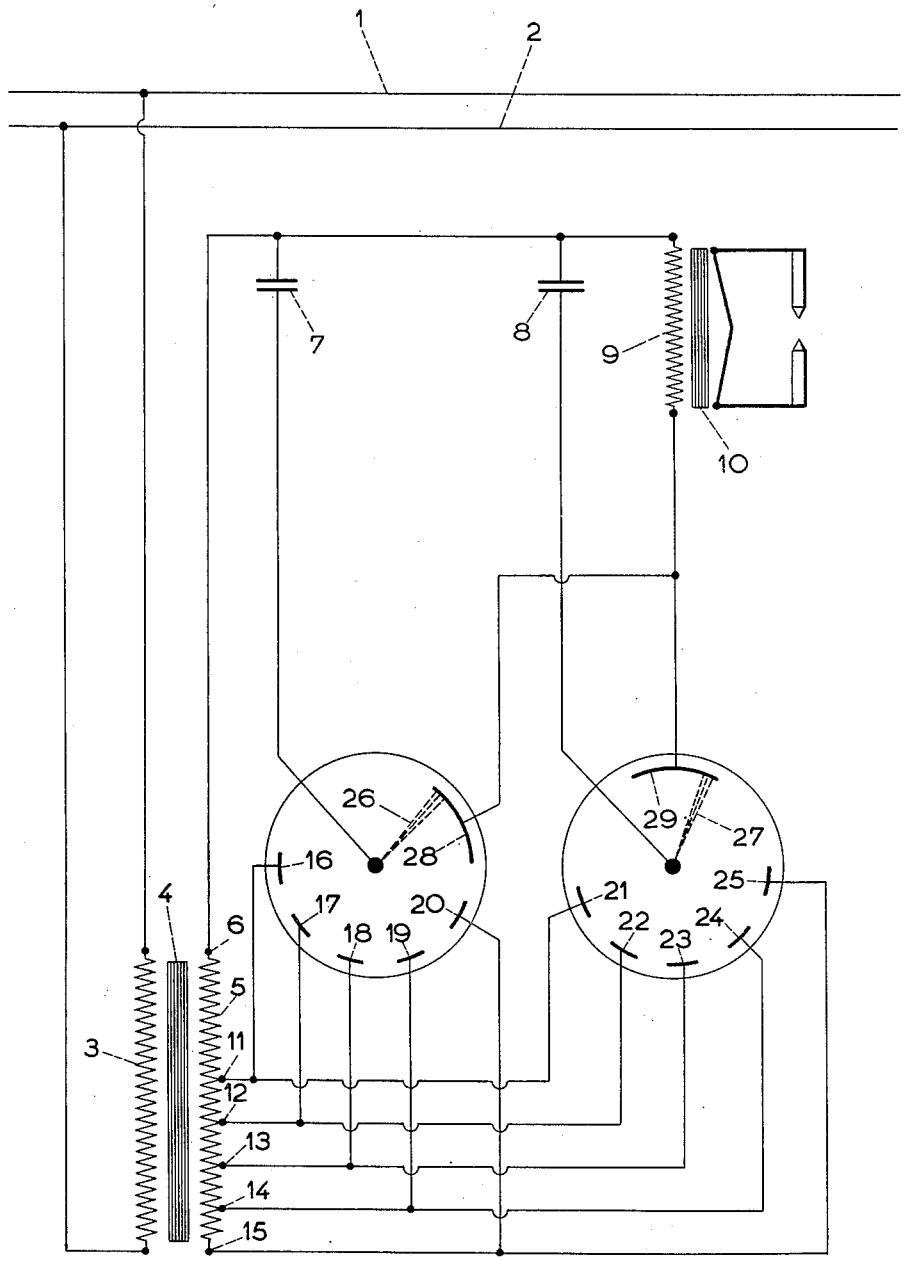

2,507,022

UNITED STATES PATENT OFFICE 2,507,022

RESISTANCE ELECTRIC WELDING METHOD

Jacques Languepin, Paris, France, assignor to Societe La Soudure Electrique, Paris, France, a corporation of France Application November 18, 1947, Serial No. 786,749 In France May 6, 1939

Section 1, Public Law 690, August 8, 1946 Patent expires May 6, 1959

2 Claims. (Cl. 219—4)

Electric welding machines have long been described in which use is made of power accumulation in a static condenser which is discharged in the primary winding of a transformer in order to execute the weld.

Usually in such machines, direct current generators or rectifiers of known types are used for charging the condensers.

In my French application filed April 20, 1939, entitled "Improvements in Resistance electric welding machines," I have proposed the use of synchronous commutators comprising a rotating mercury jet or jets for supplying resistance welding machines of all kinds and controlling the operation thereof, as well as various improvements in these commutators.

The present invention is a further development of these proposals and the main object thereof is the use of rotating mercury jet commutators and particularly those described in the said application, for controlling the operation of welding machines operating with a condenser discharge.

It is known that the charging of a condenser under constant potential is obtainable with low efficiency. Thus it is of interest to ensure the charge under variable potential and rotating mercury jet synchronous commutators enable this requirement to be fulfilled. On the other hand it is also known that the discharge time of a condenser in a circuit including a resistance and a reactance is governed by a law depending on the values of the capacity, of the resistance and of the reactance.

The constructional conditions of a welding machine do not always permit to conciliate easily the values imposed by the utilisation and constructional requirements with the values giving the most favourable durations for the flow of the current. In certain cases, a lowering in the efficiency of the welding machine must be allowed to secure a flow of sufficiently extended duration. On the other hand, the use of a discharging wave of constant direction and relatively long duration results in a very bad utilisation of the electrical part of the welding machine.

To avoid these difficulties, two or more successive condenser discharges have been used, and the use of rotating mercury jet commutators enables such a cycle of operation to be applied.

The annexed drawing shows an arrangement embodying the invention.

In this drawing, all the auxiliary members of a welding machine, as well as the driving devices thereof which are useless for the understanding of the invention, have been omitted in order to simplify the description.

Referring to the drawing, 1 and 2 designate the two supply mains. These mains feed the primary winding 3 of a transformer 4, the secondary winding 5 of which is provided with several tapping points providing for several potentials of increasing values. One end 6 of this secondary winding is connected with one or two or a multiplicity of condenser batteries as well as with the primary winding 9 of the welding transformer 10.

Each of the tapping points 11, 12, 13, 14 and 15 is connected to one of the contact pieces 16, 17, 18, 19, 20 and 21, 22, 23, 24, 25 of each of the two rotating mercury jet commutators used.

Naturally, any number of tapping points may be used without exceeding the spirit of the invention.

The contact pieces of the two commutators which are connected to the same tapping point are displaced with half a period in such a way that the mercury jet 26 allows for the passage of the current in one direction only, while the mercury jet 27 allows for the passage of the current in the other direction only. The length of these contact pieces is suitably selected so that the cut-out takes place with an intensity having zero value or a very small value only. Through the mercury jets 26 and 27 the condensers 7 and 8 are connected in succession with the tappings 11, 12, 13, 14 and 15, and consequently these condensers 7 and 8 will be charged in opposite directions. Let us indeed consider for instance the contact pieces 16 and 21 respectively of the mercury jet switches, which are connected to the same tapping 11 of the secondary 5. As previously stated, the piece 16 is connected to the lower terminal of condenser 7 through the mercury jet 26 during the presence of one alternation of given polarity of the A. C. supply current, while the piece 21 is connected to the lower terminal of the condenser 8 through the mercury jet 27 during the next succeeding alternation of the supply current, the polarity of which is opposite that applied to condenser 7. During the next succeeding alternation of the current, the potential is taken from the next tapping 12, since at that time the mercury jet 26 passes onto the contact piece 17, whereby the condenser 7 is further charged in the same direction, but with increased voltage, and so on. The charge takes place under increasing potential, that is in the best conditions of efficiency. After the charging operation, the mercury jet 26 strikes the contact piece 28 which is connected to the primary winding 9 of the transformer 10 and thus the condenser 7 will discharge in this transformer. When the mercury jet 26 is leaving the contact piece 28, the mercury jet 27 will strike the contact piece 29 and cause the discharge of the condenser 8 in the primary winding of the transformer 10, but in the opposite direction.

It will be seen that the above described arrangement enables the charge of condenser batteries to be obtained under the best possible conditions and also the passage through the primary winding of a welding transformer of several successive discharges of two or more charged condensers, successively in opposite directions.

Naturally the device may be arranged to be fed with bi- or triphased supply systems, and it may be used with any desired number of condenser batteries without exceeding the spirit of the invention.

Also all the welding elements may be modified in the course of the operation, and particularly condensers of different capacities may be used for the successive discharges, or condensers having the same capacity may be charged under different potentials, or the pressure on the weld may be modified during the operation.

What I claim is:

1. A method of electric resistance welding by means of one pair of electric condensers, each of said condensers being adapted to be connected to successive tappings on a supply transformer through a related switch and to a welding transformer, said method comprising sequentially charging the condensers of each pair in reverse directions with respect to each other under increasing potentials during successive alternations of reverse polarity of the A. C. supply current through said related switches, and successively discharging said condensers of each pair into the primary winding of said welding transformer through a contact of the related switch.

2. A method of electric resistance welding by means of one pair of electric condensers, each of said condensers being adapted to be connected to successive tappings on a supply transformer through the successive contacts of a related switch, and to a welding transformer, said method comprising sequentially connecting one terminal of a first condenser of a pair to the successive contacts of the related switch during successive half alternations of the same polarity of the A. C. supply current, sequentially connecting one terminal of the other condenser of the said pair to the successive contacts of the related switch during successive half-alternations of the A. C. supply current having the polarity opposite that applied to said first condenser of the same pair, and successively connecting said terminals of the condensers of a pair to the primary winding of said welding transformer through a contact of said related switch.

JACQUES LANGUEPIN.

REFERENCES CITED

The following references are of record in the file of this patent:

UNITED STATES PATENTS

| Number | Name | Date |
|---|---|---|
| 2,235,385 | Rava | Mar. 18, 1941 |
| 2,319,215 | Dawson | May 18, 1943 |

FOREIGN PATENTS

| Number | Country | Date |
|---|---|---|
| 519,353 | Great Britain | Mar. 21, 1940 |
| 548,618 | Great Britain | Oct. 16, 1942 |
| 859,306 | France | June 3, 1940 |